June 29, 1965  H. D. DOUGHERTY  3,191,339
INSECT SWATTER
Filed Dec. 18, 1961  2 Sheets-Sheet 1
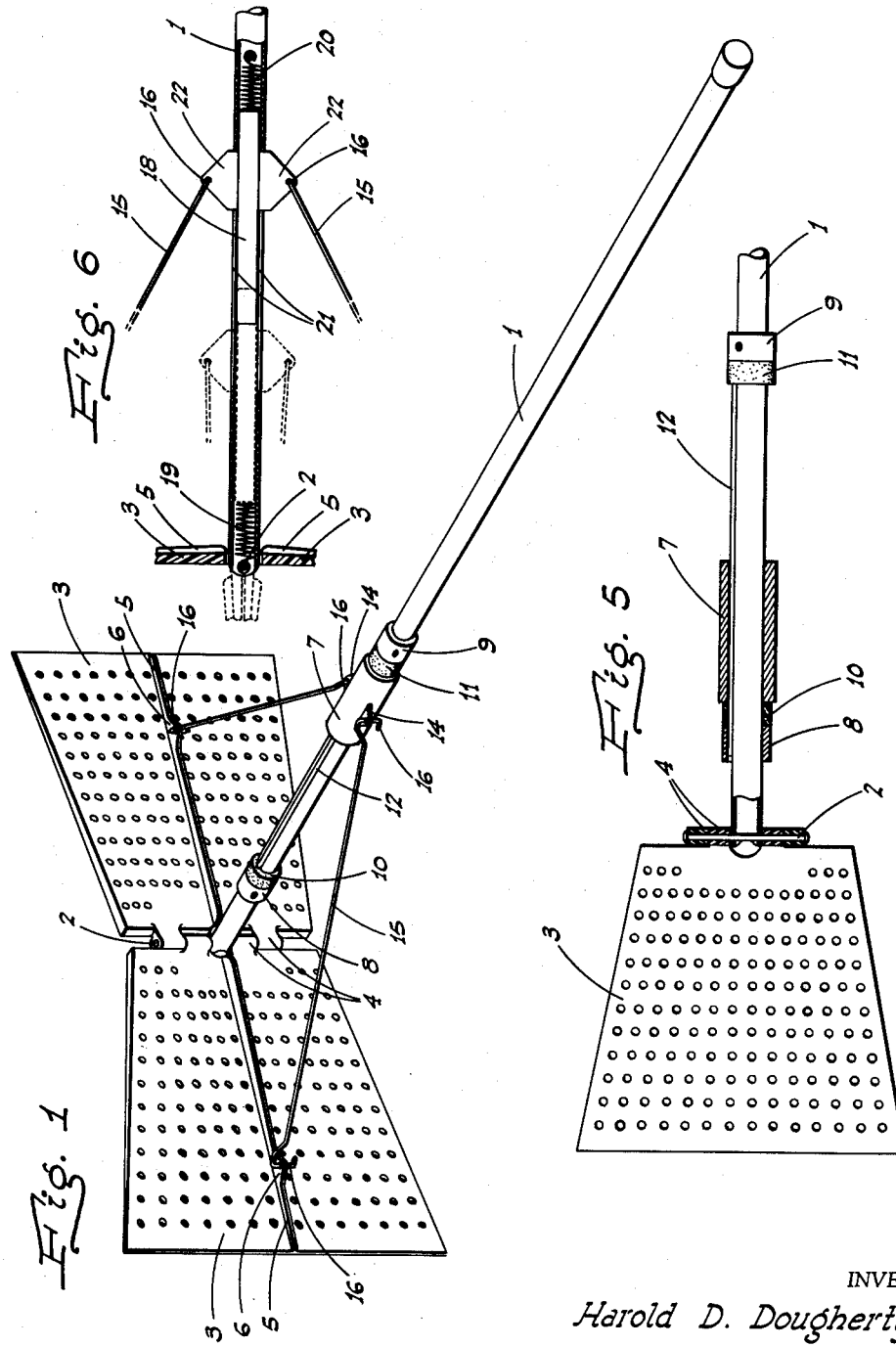
INVENTOR
Harold D. Dougherty
BY Webster & Webster
ATTORNEYS June 29, 1965  H. D. DOUGHERTY  3,191,339
INSECT SWATTER
Filed Dec. 18, 1961  2 Sheets-Sheet 2
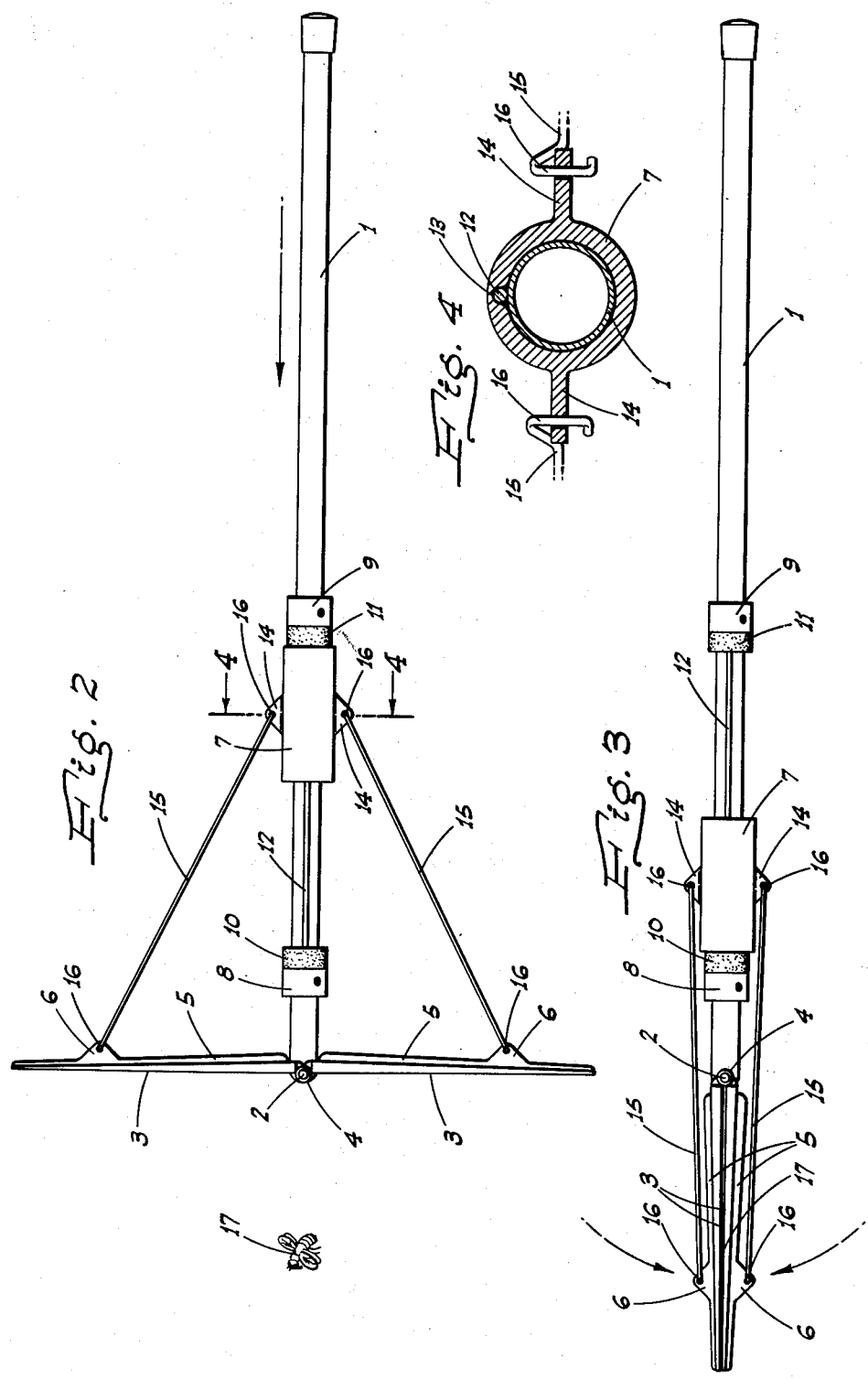

3,191,339
INSECT SWATTER
Harold D. Dougherty, P.O. Box 65, Farmersville, Calif.
Filed Dec. 18, 1961, Ser. No. 160,120
8 Claims. (Cl. 43—137)

This invention relates in general to a novel desire for swatting insects such as flies, moths, mosquitoes, or the like.

In particular, the invention is directed to, and it is a major object to provide, a hand supported device which is operative to swat insects in mid air or on the fly, thus avoiding possible damage or soiling of furniture, walls, curtains, etc., which may occur with a conventional "fly swatter."

An additional object of the invention is to provide a device which has an action generally simulating a person slapping his hands together on a flying insect to kill it.

Another object of the invention is to provide an insect swatter which includes an elongated handle having a pair of initially widely spread apart or oppositely laterally projecting swatter flaps hinged at adjacent ends on the front end of the handle, with actuating means mounted on said handle and associated with such flaps to forcefully clap them together when the device is manually thrust forwardly toward, and then suddenly stopped just prior to reaching, a flying insect whereby the latter is caught between and killed by the impact of such flaps as they clap together.

Still another object of the invention is to provide an insect swatter, as in the preceding paragraph, wherein said actuating means includes a normally retracted relatively heavy member slidable forwardly on the handle from an initially retracted position and connected in thrust relation to the swatter flaps in a manner to simultaneously swing the same forwardly and laterally inwardly upon said member sliding forwardly on the handle when the forward motion of the latter is stopped.

A further object of the invention is to provide an insect swatter designed for ease and economy of manufacture and convenience of use.

A still further object of the invention is to provide a practical, reliable, and durable insect swatter, and one which is exceedingly effective for the purpose for which it is designed.

These objects are accomplished by means of such structure and relative arrangement of parts as will fully appear by a perusal of the following specification and claims.

In the drawings:

FIG. 1 is a perspective view of the insect swatter with the parts thereof in their initial or starting position.

FIG. 2 is a plan view of the device with the parts as in FIG. 1; the device being shown as being thrust toward a flying insect and immediately before the handle motion is stopped.

FIG. 3 is a similar view but shows the device after the handle motion has been stopped and the swatter flaps have closed on and killed the insect.

FIG. 4 is an enlarged cross section on line 4—4 of FIG. 2.

FIG. 5 is a fragmentary side elevation of the device, partly in section and showing the flap actuating sleeve in its advanced position as in FIG. 3.

FIG. 6 is a fragmentary plan view, partly in section and on reduced scale, of a modification.

Referring now more particularly to the drawings and to the characters of reference marked thereon, and at present to the embodiment of FIGS. 1–5, inclusive, the insect swatter comprises an elongated tubular handle 1 which is circular in cross section.

At its front end, such handle carries a fixed vertical pivot pin 2 which projects both above and below said handle.

A pair of flat faced swatter flaps 3 are hinged, as at 4, at their adjacent or inner ends to the projecting portions of the pivot pin 2 whereby said flaps 3 are mounted for swinging motion from oppositely laterally projecting initial positions (see FIGS. 1 and 2) to forwardly projecting positions in face to face engagement (see FIG. 3).

The swatter flaps 3 are preferably made of a lightweight but relatively stiff material such as plastic; each of such flaps being provided with a multiplicity of perforations as shown. A stiffening rib 5 is formed on the back of each flap 3 and extends from the inner to the outer ends substantially midway between the upper and lower edges of such flap; there being an integral, rearwardly projecting ear 6 included on each rib 5 adjacent but short of its outer end.

A relatively heavy, somewhat elongated inertia sleeve 7 is slidably disposed on the forward portion of the handle 1; the limit of travel of such sleeve 7 being determined by a front stop collar 8 and a rear stop collar 9 surrounding and secured to said handle in spaced relation lengthwise thereof, and with the front stop collar 8 spaced rearwardly from the pivot pin 2.

A front cushion collar 10 and a rear cushion collar 11 are disposed on the handle 1 in abutment with the stop collars 8 and 9, respectively, and between the same and said sleeve 7.

A longitudinal guide rib 12 is fixed exteriorly on the handle 1 and extends between the stop collars 8 and 9; the sleeve 7 being formed with an internal longitudinal groove 13 in which the guide rib 12 is received whereby to prevent rotation of said sleeve on the handle.

The sleeve 7 is formed on opposite sides with laterally outwardly projecting ears 14, and thrust rods 15 extend in initially diverging relation from such ears 14 to the corresponding ears 6 at the back of the flaps 3; such rods —at the ends thereof—being pivotally hooked to the adjacent ears, as at 16.

In use of the above described insect swatter, the handle 1 is manually grasped rearwardly of the stop collar 9, the sleeve 7 being at the start in its fully retracted position, as in FIGS. 1 and 2, and the swatter flaps 3 then being in oppositely laterally projecting positions.

Thereafter, the device is thrust in the direction of the flying insect 17, but immediately before the flaps 3 reach such insect the forward motion of the handle 1 is abruptly stopped. This causes the sleeve 7 to slide forward forcefully on the handle with the result that the thrust rods 15 swing the swatter flaps forwardly and into engagement with a clap, catching and killing the insect 17 between such flaps.

With very little practice, the device can be used quickly and effectively for trapping and killing a flying insect.

The front stop collar 8 and the associated front cushion collar 10 are disposed on the handle 1 at a point to stop forward travel of sleeve 7 on said handle at the moment the swatter flaps 3 come together; this to the end that bending of the thrust rods 15, and which are relatively light, will be prevented.

The rear stop collar 9 and its associated cushion collar 11 are disposed on the handle 1 at a point such that the sleeve 7 cannot be retracted rearwardly beyond the position in which the swatter flaps 3 are in substantially transverse alinement.

In FIG. 6, which illustrates a modification, the general assembly remains the same, including the tubular handle 1, swatter flaps 3, and thrust rods 15.

Here, however the inertia member is a relatively heavy elongated plunger 18 slidably disposed in the forward portion of the handle 1; the length of the path of travel of said plunger being defined and limited by a front compression spring 19 and a rear compression spring 20 mounted in the handle at longitudinally spaced points.

Along the path of travel of the plunger 18 and on opposite sides of the handle 1, the latter is formed with longitudinal slots 21; the plunger 18 being provided on opposite sides with laterally outwardly projecting ears 22 which extend through slots 21 and terminate exteriorly of the handle.

The thrust rods 15 are pivotally connected to the corresponding ears 22 in the same manner as in the previously described embodiment.

The device, modified as in FIG. 6 and including the internal slidable plunger 18, is used and functions in the same manner as in said previously described embodiment.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An insect swatting device comprising an elongated handle, a pair of swatter flaps, means hinging the flaps at adjacent ends on the front end of the handle for swinging motion of said flaps from oppositely laterally projecting initial positions to forwardly projecting positions in face to face engagement, a member loosely slidably supported by the handle, such member being adapted to slide forwardly from an initially retracted position lengthwise of the handle, stop means on the handle to limit forward and rearward sliding movement of said member, and connecting means between said member and flaps operative to impart such swinging motion to said flaps so as to forcibly clap the same together upon and in response to such forward sliding movement of said member; said member being relatively heavy whereby upon the handle being manually thrust forwardly and then abruptly stopped, said member will advance of itself by reason of inertia.

2. A device, as in claim 1, in which said member is a sleeve surrounding and slidable on the handle, and said stop means comprises longitudinally spaced stop collars secured on the handle; the sleeve being disposed on the handle for sliding between said collars.

3. A device, as in claim 2, including a cushion collar on the handle between the sleeve and each stop collar, with each cushion collar abutting the corresponding stop collar.

4. An insect swatting device comprising an elongated handle, a pair of swatter flaps, means hinging the flaps at adjacent ends on the front end of the handle for swinging motion of said flaps from oppositely laterally projecting initial positions to forwardly projecting positions in face to face engagement, a sleeve loosely slidably mounted on the handle, such sleeve being adapted to slide forwardly from an initially retracted position on the handle, stop means on the handle to limit such forward sliding movement of said sleeve, ears projecting from opposite sides of the sleeve, an ear on the back of each flap a substantial distance outwardly of the hinge means, and thrust rods pivotally connected with and extending between corresponding ears on the sleeve and flaps; said rods converging toward the sleeve and being operative to impart such swinging motion to the flaps upon and in response to such forward sliding movement of said sleeve; said sleeve being relatively heavy whereby upon the handle being manually thrust forwardly and then abruptly stopped, the sleeve will advance of itself along the handle by reason of inertia.

5. An insect swatting device comprising an elongated handle, a pair of swatter flaps, means hinging the flaps at adjacent ends on the front end of the handle for swinging motion of said flaps from oppositely laterally projecting initial positions to forwardly projecting positions in face to face engagement, the handle being tubular, a relatively heavy elongated plunger slidably disposed in the handle, such plunger being adapted to slide forwardly from an initially retracted position upon the handle being manually thrust forwardly and then abruptly stopped, the handle being slotted along the path of sliding movement of the plunger, stop means supported by the handle to limit forward and rearward sliding movement of the plunger, attachment means on the plunger extending to exteriorly of the handle through the slotted portion thereof, and connecting means between the exterior part of said attachment means and the flaps operative to impart such swinging motion to said flaps so as to forcefully clap the same together upon and in response to such forward sliding movement of said plunger.

6. A device, as in claim 5, the stop means including a compression spring mounted in the handle in position to cushion and stop such forward sliding movement of said plunger.

7. A device, as in claim 5, in which the handle is slotted on opposite sides, the attachment means being ears on opposite sides of the plunger, the ears extending outwardly through corresponding slots, and said connecting means being thrust rods pivoted on the exterior parts of the ears and thence extending forwardly in initially diverging relation to pivotal connection with corresponding flaps at the back thereof.

8. An insect swatting device comprising an elongated handle, a pair of swatter flaps, means hinging the flaps at adjacent ends on the front end of the handle for swinging motion of said flaps from opposed laterally projecting initial positions to forwardly projecting positions in face to face engagement, a member loosely slidably supported by the handle, stop means on the handle limiting rearward movement of the member thereon and connecting means between the member and flaps arranged so that when the member is in a rearward position, the flaps are in said opposed position, and to cause the flaps to be swung to said face to face position upon advance of the member a predetermined distance from the stop means; said member being relatively heavy whereby upon the handle being thrust forwardly and then abruptly stopped, the member will advance on the handle to said forward position by reason of inertia and cause the flaps to be swung to said face to face position.

References Cited by the Examiner

UNITED STATES PATENTS

| 798,825 | 9/05 | Petersen | 43—135 |
| 1,468,373 | 9/23 | Blake | 43—135 |

ABRAHAM G. STONE, *Primary Examiner.*

SAMUEL KOREN, *Examiner.*